United States Patent
Chen

(10) Patent No.: US 7,652,672 B2
(45) Date of Patent: Jan. 26, 2010

(54) SYSTEMS AND METHODS FOR TEXTURE MANAGEMENT

(75) Inventor: Cheng-Che Chen, Kaohsiung (TW)

(73) Assignee: Mediatek, Inc., Hsin-Chu (TW)

( * ) Notice: Subject to any disclaimer, the term of this patent is extended or adjusted under 35 U.S.C. 154(b) by 319 days.

(21) Appl. No.: 11/427,451

(22) Filed: Jun. 29, 2006

(65) Prior Publication Data

US 2008/0001960 A1 Jan. 3, 2008

(51) Int. Cl.
G06T 11/40 (2006.01)
G06F 12/02 (2006.01)

(52) U.S. Cl. .................... 345/552; 345/544
(58) Field of Classification Search ............ None
See application file for complete search history.

(56) References Cited

U.S. PATENT DOCUMENTS

| | | | | |
|---|---|---|---|---|
| 5,467,081 A | * | 11/1995 | Drews et al. | 340/5.22 |
| 5,654,950 A | * | 8/1997 | Itoh | 369/47.12 |
| 5,684,785 A | * | 11/1997 | Itami et al. | 369/275.2 |
| 7,164,426 B1 | * | 1/2007 | Duluk et al. | 345/564 |
| 2004/0157639 A1 | * | 8/2004 | Morris et al. | 455/550.1 |

FOREIGN PATENT DOCUMENTS

| CN | 1177784 | 4/1998 |
|---|---|---|
| CN | 1506852 | 6/2004 |

OTHER PUBLICATIONS

English abstract of CN1177784.
English abstract of CN1506852.

* cited by examiner

*Primary Examiner*—Kee M Tung
*Assistant Examiner*—Jacinta Crawford
(74) *Attorney, Agent, or Firm*—Thomas, Kayden, Horstemeyer & Risley

(57) ABSTRACT

Methods for texture image management are provided. An embodiment of a method for texture image management comprises the following steps. A texture image is acquired from a non-writable memory device. The received texture image is directly applied to a fragment.

14 Claims, 12 Drawing Sheets

SYSTEMS AND METHODS FOR TEXTURE MANAGEMENT

BACKGROUND

The invention relates to computer graphics, and more particularly, to systems and methods for texture image management.

In 3D graphics rendering, a graphics pipeline is provided to transform a three-dimensional scene into a two-dimensional image. Several texture images are applied to fragments during a pixel shading stage.

SUMMARY

Methods for texture image management are provided. An embodiment of a method for texture image management comprises the following steps. A texture image is acquired from a non-writable memory device. The received texture image is directly applied to fragments.

An embodiment of a method for texture image management, performed by a 3D graphics engine, comprises the following steps. Information indicating that a texture image is stored in a first region of a memory device is received from an application. It is determined whether the first region of the memory device is a read-only (RO) region or a read-write (RW) region. An RO attribute corresponding to the indicated texture image is generated to indicate that the texture image is stored in the RO region when determining that the first region of the memory device is the RO region, thereby enabling the texture image retrieved from the first region to be applied to fragments.

An embodiment of a method for texture image management, performed by a 3D graphics engine, comprises the following steps. Information indicating that content of a sub-region of a first texture image is to be updated with a second texture image is received from an application. It is determined whether the first texture image is located in a read-only (RO) region or a read-write (RW) region. A new region of a writable memory device is allocated when the first texture image is located in the RO region. The first texture image is stored in the allocated region of the writable memory device. The sub-region of the first texture image in the allocated region of the writable memory device is updated with the second texture image.

Systems for texture image management, employed in a portable electronic device, are also provided. An embodiment of a system for texture image management comprises a non-writable memory device and a processor. The non-writable memory device stores a texture image. The processor, coupling to the non-writable memory device, acquires the texture image from the non-writable memory device and directly adds the received texture image to fragments.

An embodiment of a system for texture image management comprises a memory device and a processor. The memory device stores a texture image. The processor, coupling to the memory device, executes a 3D graphics engine and an application. The 3D graphics engine receives information indicating that the texture image is stored in a first region of the memory device from the application, determines whether the first region of the memory device is an RO region or an RW region, and generates an RO attribute corresponding to the indicated texture image to indicate that the texture image is stored in the RO region when determining that the first region of the memory device is the RO region, thereby enabling the texture image retrieved from the first region to be applied to fragments.

An embodiment of a system for texture image management comprises a memory device, a writable memory device and a processor. The memory device stores a first texture image. The processor, coupling to the memory device and the writable memory device, executes a 3D graphics engine and an application. The 3D graphics engine receives information indicating that content of a sub-region of the first texture image is to be updated with a second texture image from an application, determines whether the first texture image is located in an RO region or an RW region, allocates a new region of the writable memory device when the first texture image is located in the RO region, stores the first texture image in the allocated region of the writable memory device and updates the sub-region of the first texture image in the allocated region of the writable memory device with the second texture image.

BRIEF DESCRIPTION OF THE DRAWINGS

The invention can be more fully understood by reading the subsequent detailed description and examples with references made to the accompanying drawings, wherein.

DETAILED DESCRIPTION

Figure 1:
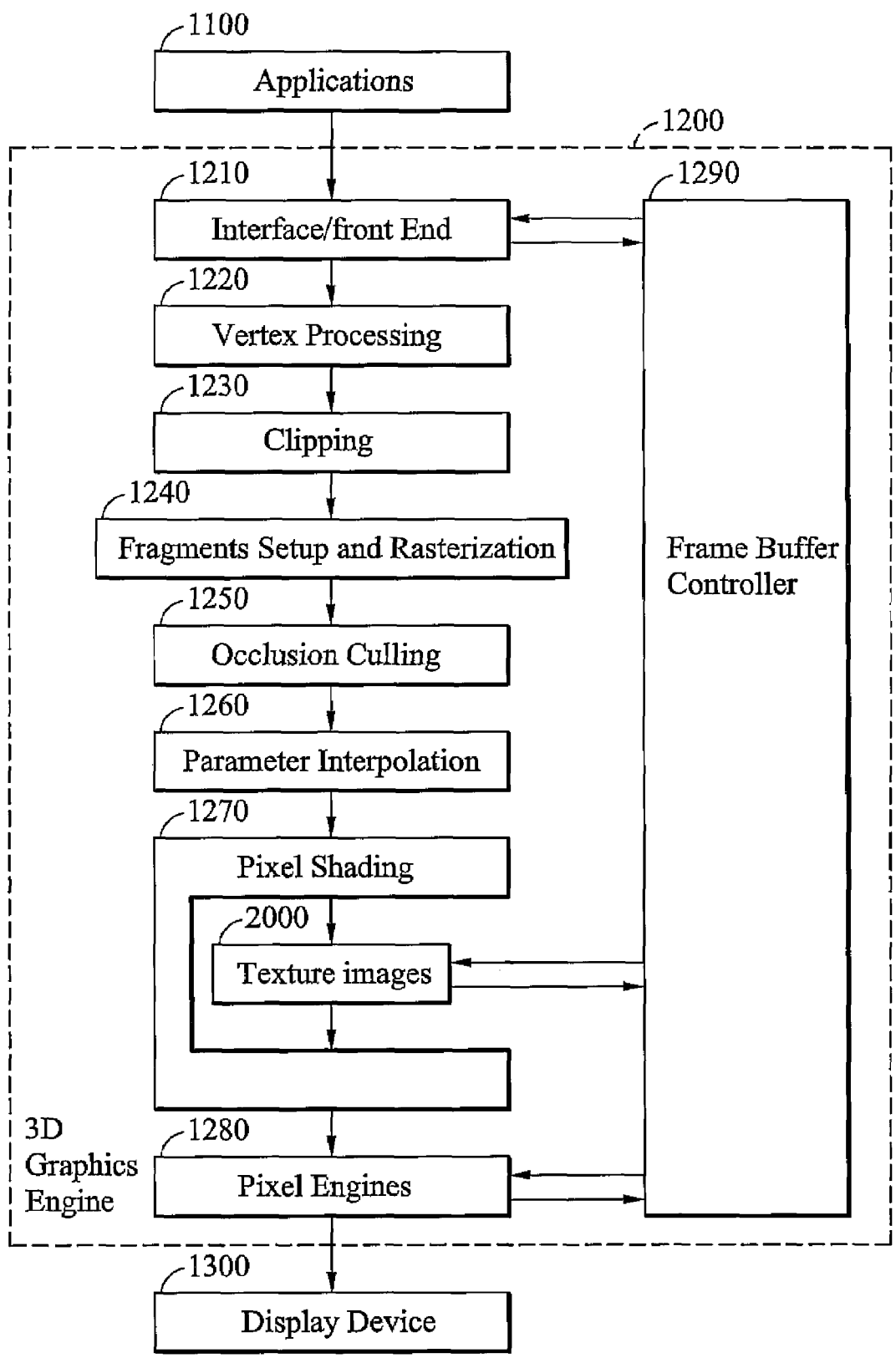
FIG. 1 is a diagram of an embodiment of a 3D graphics engine.

In 3D graphics rendering, a graphics pipeline is provided to transform a three-dimensional scene into a two-dimensional image. FIG. 1 is a diagram of an embodiment of a 3D graphics engine 1200 comprising several stages of a graphics pipeline, such as interface/front end 1210, vertex processing 1220, clipping 1230, fragments setup and rasterization 1240, occlusion culling 1250, parameter interpolation 1260, pixel shading 1270 and pixel engines 1280. These stages are responsible for processing information initially provided as properties at the end points (vertices) or control points of the geometric primitives used to describe what is to be rendered. The typical primitives in 3D graphics are lines and fragments. The type of properties provided per vertex includes x-y-z coordinates, RGB values, translucency, texture, reflectivity and other characteristics. In a graphics processor, all stages may work in parallel.

The interface/front end 1210 is an interface to applications, such as man-machine interface (MMI) provided by a mobile electronic device, game control or animation application, or other, in order to send and receive data and commands. Vertex processing stage 1220 converts each vertex into a 2D screen position, and lighting may be applied to determine its color. A programmable vertex shader enables the applications 1100 to perform custom transformations for effects, such as warping of deformations of a shape. The clipping stage 1230 removes several parts of the image that are not visible in the 2D screen view such as the backsides of objects or areas. The fragments setup stage 1240 collects and converts vertices into fragments, and generates information that will allow later stages to accurately generate the attributes of every pixel associated with the converted fragments. The rasterization stage 1240 fills the fragments with pixels known as "fragments," which may or may not wind up in a frame buffer if there is no change to the pixels or if it winds up being hidden. The occlusion culling stage 1250 removes pixels that are hidden (i.e. occluded) by other objects in the 2D screen. The parameter interpolation stage 1260 computes values for each rasterized pixel based on color, fog, texture or other. The pixel shading stage 1270 adds texture images 2000 and final colors to the fragments. A texture image is composed of multiple texels (also called texture elements). A programmable pixel shader, also called a "fragment shader," enables the applications 1100 to combine attributes of the fragments, such as color, depth and position on 2D screen, with attributes of texels of the texture images 2000 in a user-defined way to generate custom shading effects. The pixel engines 1280 mathematically combine the final fragment color, coverage and degree of transparency with the existing data stored at the associated 2D location in the frame buffer to generate the final color for the pixel to be stored at that location. Output is a depth (Z) value for each pixel. The frame buffer controller 1290 are an interface to physical memory used to hold the actual pixel values displayed on a display device 1300, such as a color super-twisted nematic (CSTN) display, a thin film transistor-liquid crystal display (TFT-LCD), an organic light-emitting diode (OLED) display or other. The frame buffer memory further stores graphics commands, texture images 2000 as well as other attributes associated with each pixel. Systems and methods for texture image management are provided in order to effectively handle the texture images 2000.

Figure 2:
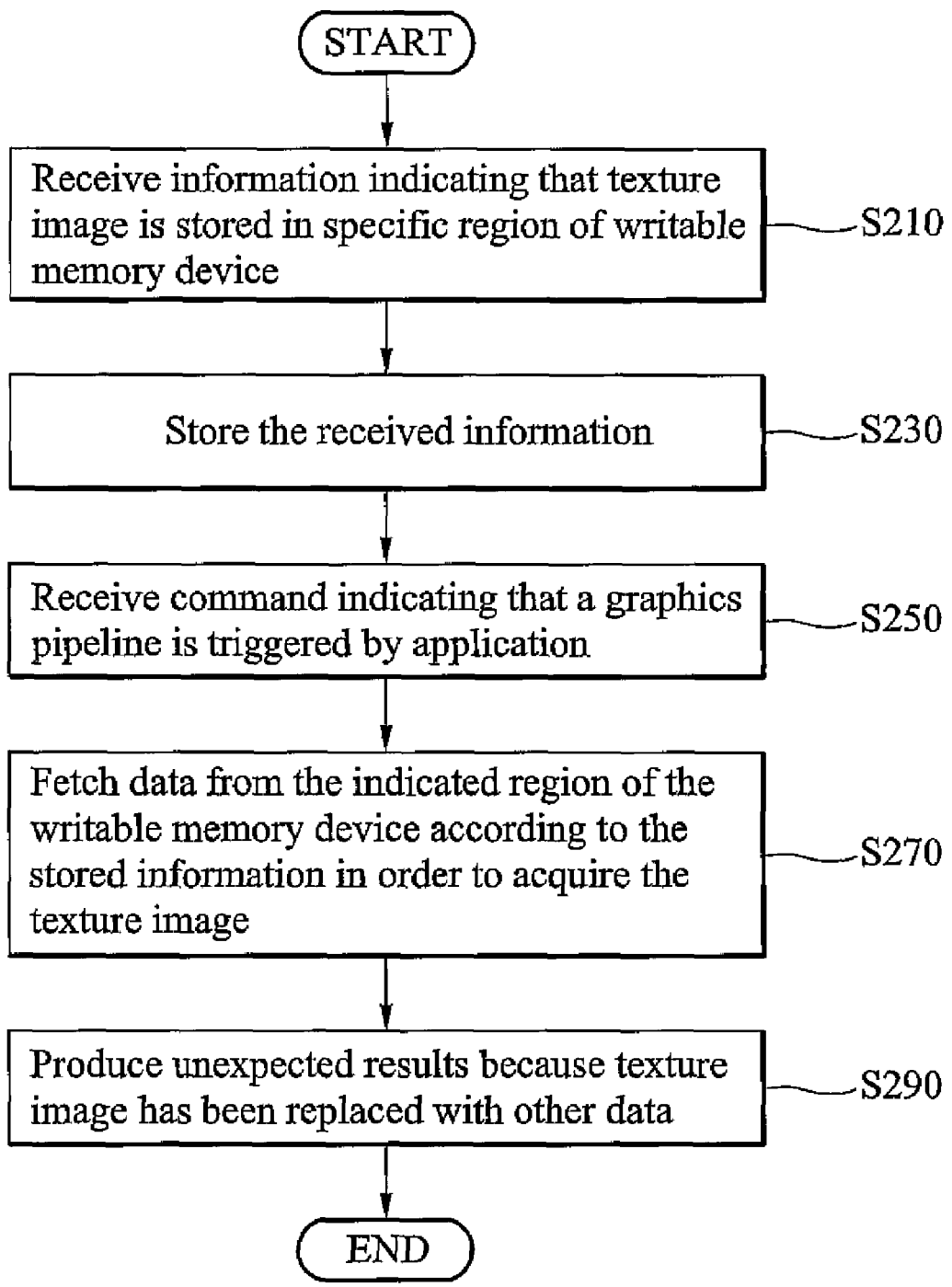
FIGS. 2 and 3*a* are flowcharts illustrating embodiments of methods for texture image management.

FIG. 2 is a flowchart illustrating an embodiment of a method for texture image management, performed by a 3D graphics engine such as an OpenGL or DirectX graphics engine or other, known to the inventors for managing texture images. This is not prior art for purposes of determining the patentability of the invention and merely shows a problem found by the inventors. In step S210, information indicating that a texture image is stored in a specific region of a writable memory device, such as two pointers respectively pointing to the beginning and the end of the specific region, is received from an application. The information may be received via an interface such as a well-known interface "TexImage3D" set forth by section 3.8.1 of The OpenGL Graphics System: A Specification (Version 1.5) established Oct. 30, 2003. In a worst case, a specific region of the writable memory device, which originally stores the texture image is then released by the application after step S210, resulting in the texture image being replaced with other data. In step S230, the received information is stored. In step S250, a command indicating that a graphics pipeline (referring to FIG. 1) is triggered by the application is received. In step S270, data is fetched from the indicated region of the writable memory device according to the stored information in order to acquire the texture image and subsequently perform the described pixel shading (e.g. 1270 of FIG. 1). In step S290, unexpected results are produced because the texture image has been replaced with other data.

Figure 3A:
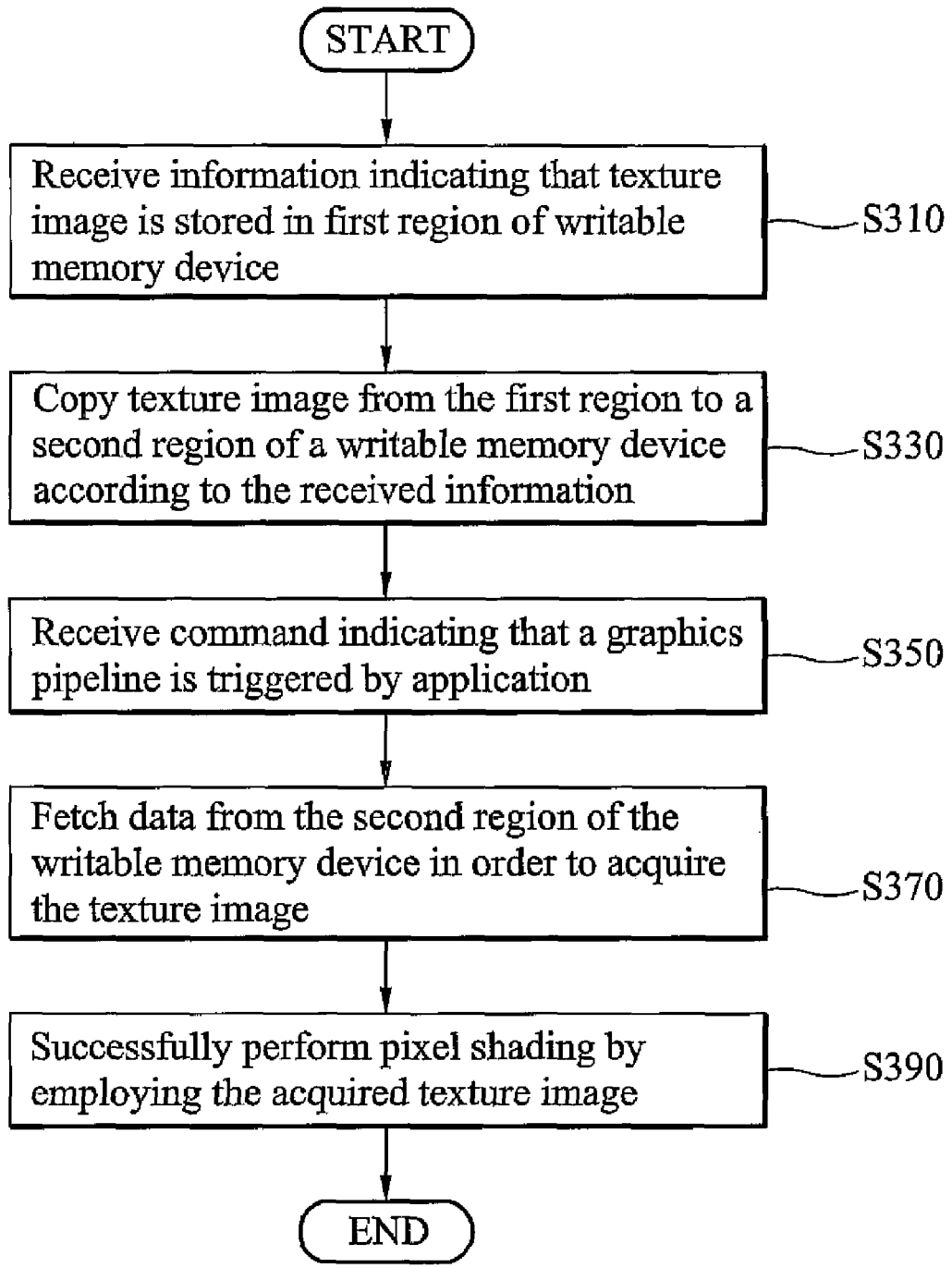
Figure 3B:
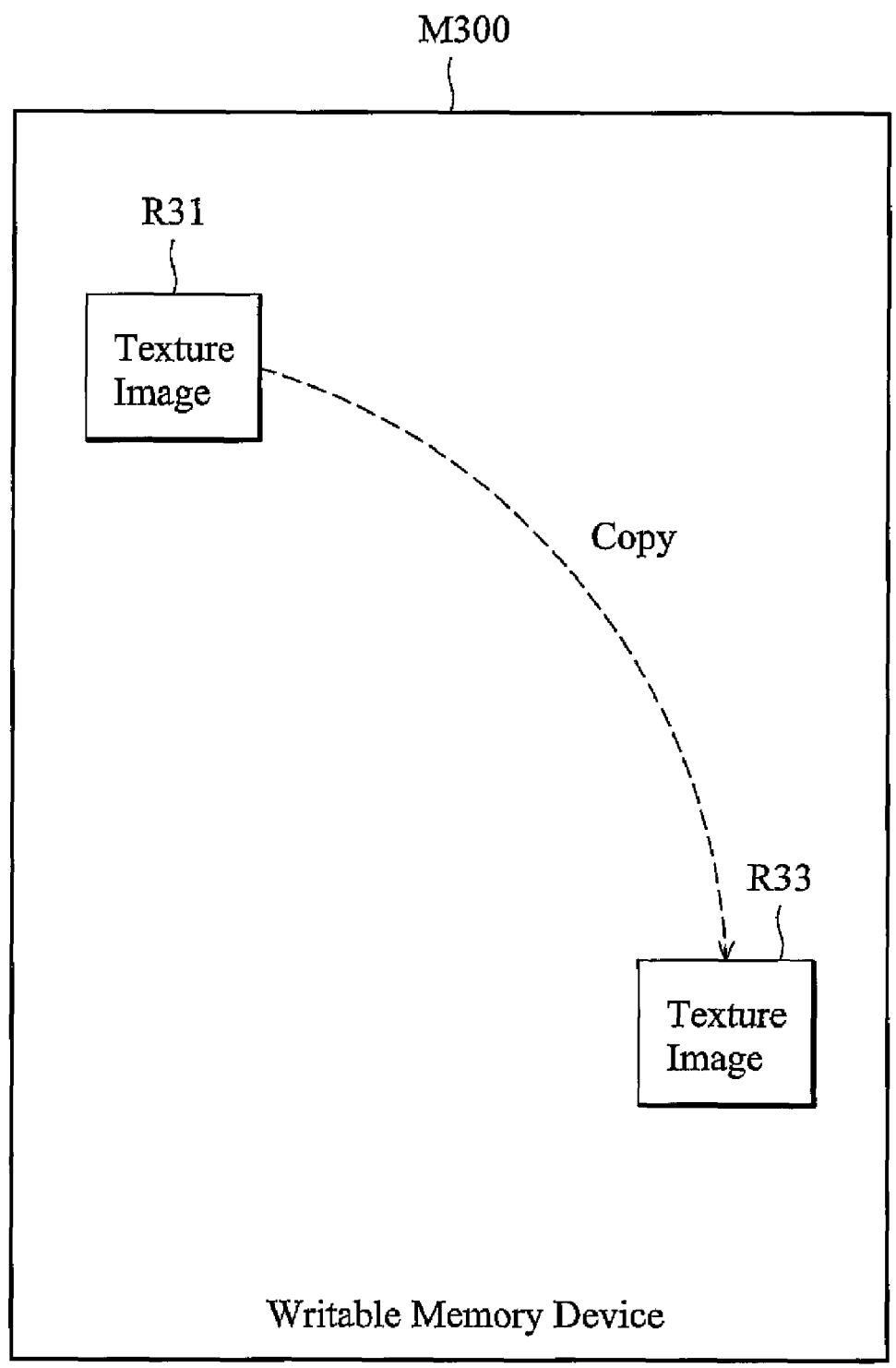
FIG. 3*b* is a diagram of an exemplary writable memory device.

FIG. 3a is a flowchart illustrating an embodiment of a method for texture image management, performed by a 3D graphics engine such as an OpenGL or DirectX graphics engine or other, known to the inventors for managing texture images. This is not prior art for purposes of determining the patentability of the invention and merely shows a solution for addressing the problem found by the inventors, as shown in FIG. 2. In step S310, information indicating that a texture image is stored in a first region of a writable memory device, such as two pointers respectively pointing to the beginning and the end of the first region, is received from an application. In step S330, the texture image is copied from the first region to a second region of a writable memory device according to the received information, where the second region is governed by the 3D graphics engine and unable to be released by the application. FIG. 3b is a diagram of an exemplary writable memory device M300. The texture image stored in a region R31 governed by (i.e. allocated to) the application is copied to a region R33 governed by (i.e. allocated to) the 3D graphics engine. In step S350, a command indicating that a graphics pipeline (referring to FIG. 1) is triggered by the application is received. In step S370, data is fetched from the second region of the writable memory device in order to acquire the texture image. In step S390, pixel shading (e.g. 1270 of FIG. 1) is successfully performed by employing the acquired texture image. It is to be understood that, no unexpected result (mentioned in step S290 of FIG. 2) is produced during the pixel shading when first region of the writable memory device is released. The texture images typically in RGBA format for efficient access in the pixel shading stage consume excessive storage capacity. For example, four 256×256 texture images in RGBA format require storage space of 1,048,576 bytes (about 1M bytes). The writable memory device, however, especially when disposed in a mobile electronic device, is an expensive and scarce resource. A need for reducing copy operations and storage capacity consumption of a writable memory device for storing texture images therefore exists.

Figure 4:
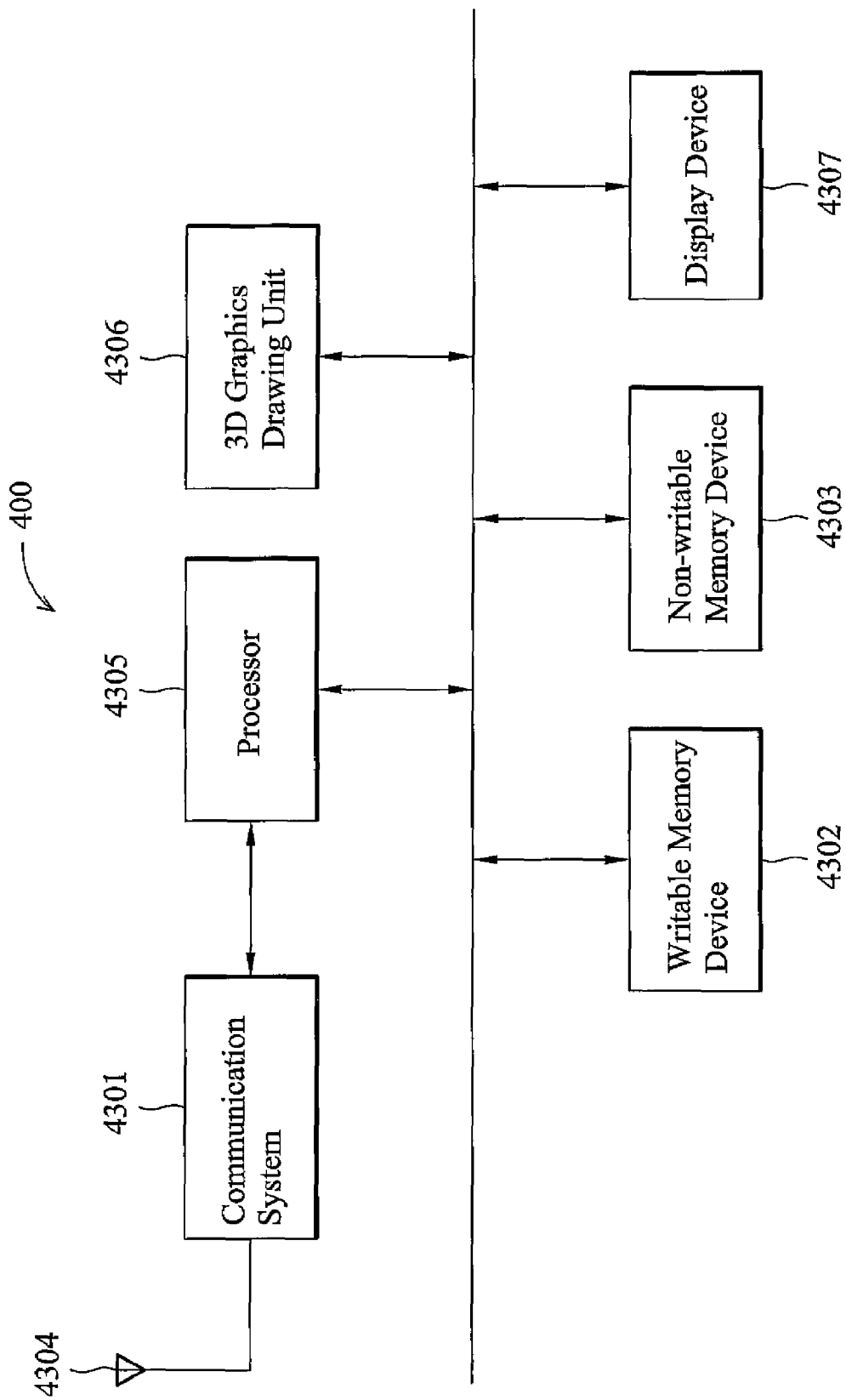
FIG. 4 is a diagram of a hardware environment applicable to a mobile electronic device.

Methods for texture image management employed in mobile electronic devices such as mobile phones, smart phones and the like, are provided. FIG. 4 is a diagram of a hardware environment applicable to a mobile electronic device 400 mainly comprising a communication system 4301, a writable memory device 4302, a non-writable memory device 4303, an antenna 4304, a processor 4305, a 3D graphics drawing unit 4306 and a display device 4307. The communication system 4301 such as global system for mobile communications (GSM), general packet radio service (GPRS), enhanced data rates for global evolution (EDGE), code division multiple access (CDMA), wideband code division multiple access (WCDMA) or circuit switched data (CSD) system or other, communicates with other remote mobile electronic devices via the antenna 4304 when connecting to a cellular network such as the GSM, GPRS, EDGE, CDMA, WCDMA, CSD network or other. The processor 4303 couples to the writable memory device 4302, non-writable memory device 4303, 3D graphics drawing engine 430 and display device 4307 via various bus architectures. The display device 4307 may be a color super-twisted nematic (CSTN) display, a thin film transistor-liquid crystal display (TFT-LCD), an organic light-emitting diode (OLED) display or other. The non-writable memory device 4303 may be read-only memory (ROM), NOR flash memory or other. The writable memory device 4302 may be dynamic random access memory (DRAM), synchronous DRAM (SDRAM), NAND flash memory or other. Texture images may be stored in the writable memory device 4302 or non-writable memory device 4303. The stored texture images may be encoded in a compressed format to reduce storage capacity and, when proceeding to the pixel shading stage, decoded in an uncompressed format such as RGBA. The 3D graphics drawing unit

4306 in a form of hardware circuits with relevant firmware such as the described programmable vertex shader, pixel shader or other to provide capability for transforming three-dimensional scenes into two-dimensional images. The 3D graphics drawing unit 4306 preferably comprises texture image decoding logics for decoding compressed texture images into uncompressed texture images.

A 3D graphics engine directed by an application such as a game control application, a man-machine interface (MMI) or other, mainly transforms a three-dimensional scene into a two-dimensional image to be displayed. In the described pixel shading stage, the 3D graphics engine (preferably with the described programmable pixel shader) acquires texture images from the writable memory device 4302 or non-writable memory devices 4303, transmits the acquired texture images to 3D graphics drawing unit 4306, enabling the 3D graphics drawing unit 4306 to add the received texture images to relevant fragments. The 3D graphics engine 4307 finally acquires a two-dimensional image generated by the 3D graphics drawing unit 4306 and directs the display device 4307 to display the acquired two-dimensional image. It is to be understood that the 3D graphics engine, application and programmable pixel shader are executed by the processor 4305.

Figure 5:
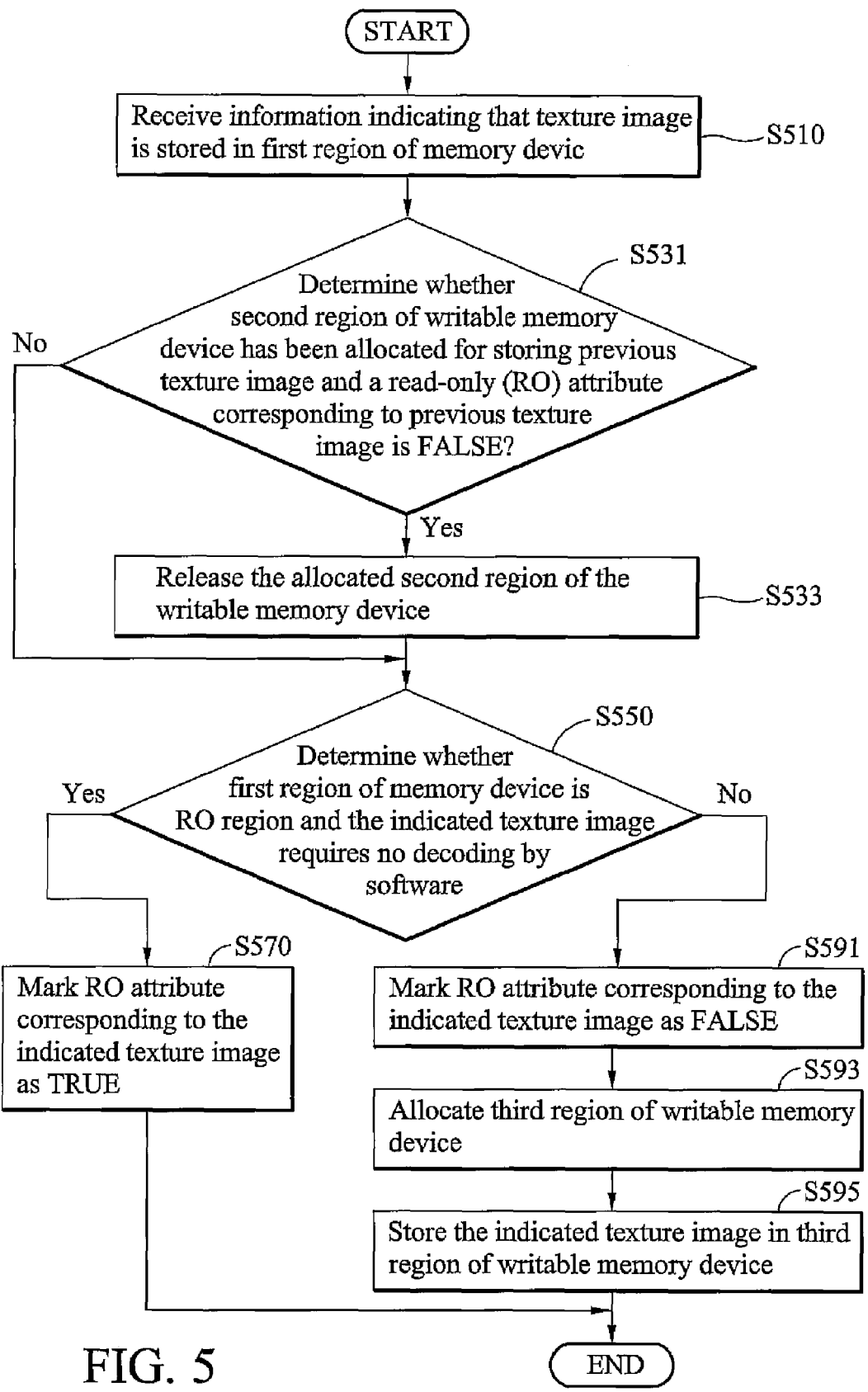
FIG. 5 is a flowchart illustrating an embodiment of a method for texture image management.

FIG. 5 is a flowchart illustrating an embodiment of a method for texture image management, performed by a 3D graphics engine such as an OpenGL or DirectX graphics engine or other. In step S510, information indicating that a texture image is stored in a first region of a memory device, such as two pointers respectively pointing to the beginning and the end of the first region, is received from an application. The memory device may be a writable memory device (e.g. 4302 of FIG. 4) or a non-writable memory device (e.g. 4303 of FIG. 4). In step S530, it is determined whether a second region of a writable memory device has been allocated for storing a previous texture image and a read-only (RO) attribute corresponding to the previous texture image is FALSE. If so, the process proceeds to step S533, otherwise, to step S550. Note that the previous texture image may have been applied to certain fragments in prior pixel shading operations. In step S533, the allocated second region of the writable memory device is released, enabling other data to be stored in this region.

In step S550, it is determined whether the first region of memory device is an RO region and the indicated texture image requires no decoding by software. If so, the process executes step S570, otherwise, executes steps S591 to S595. The first region of the memory device being an RO region indicates that modifying or deleting data stored in first region is disallowed, thus, the indicated texture image is ensured not to be damaged. For example, an RO region is a region located in a non-writable memory device, or is a region managed by the application to avoid data writes therein. The indicated texture image requires no decoding by software when the indicated texture image is an uncompressed image or a 3D graphics drawing unit (e.g. 4306 of FIG. 4) comprises hardware circuits to decode the indicated texture image in a compressed format. It is to be understood that, when the indicated texture image requires decoding by software, storage capacity of a writable memory device will be prepared to store the decoding results. In some embodiments, steps S530, S533 and S593 may be omitted, and, step S595 may be revised to store the indicated texture image in the second region of the writable memory device, resulting in reducing extra memory allocation of the third region.

Figure 6:
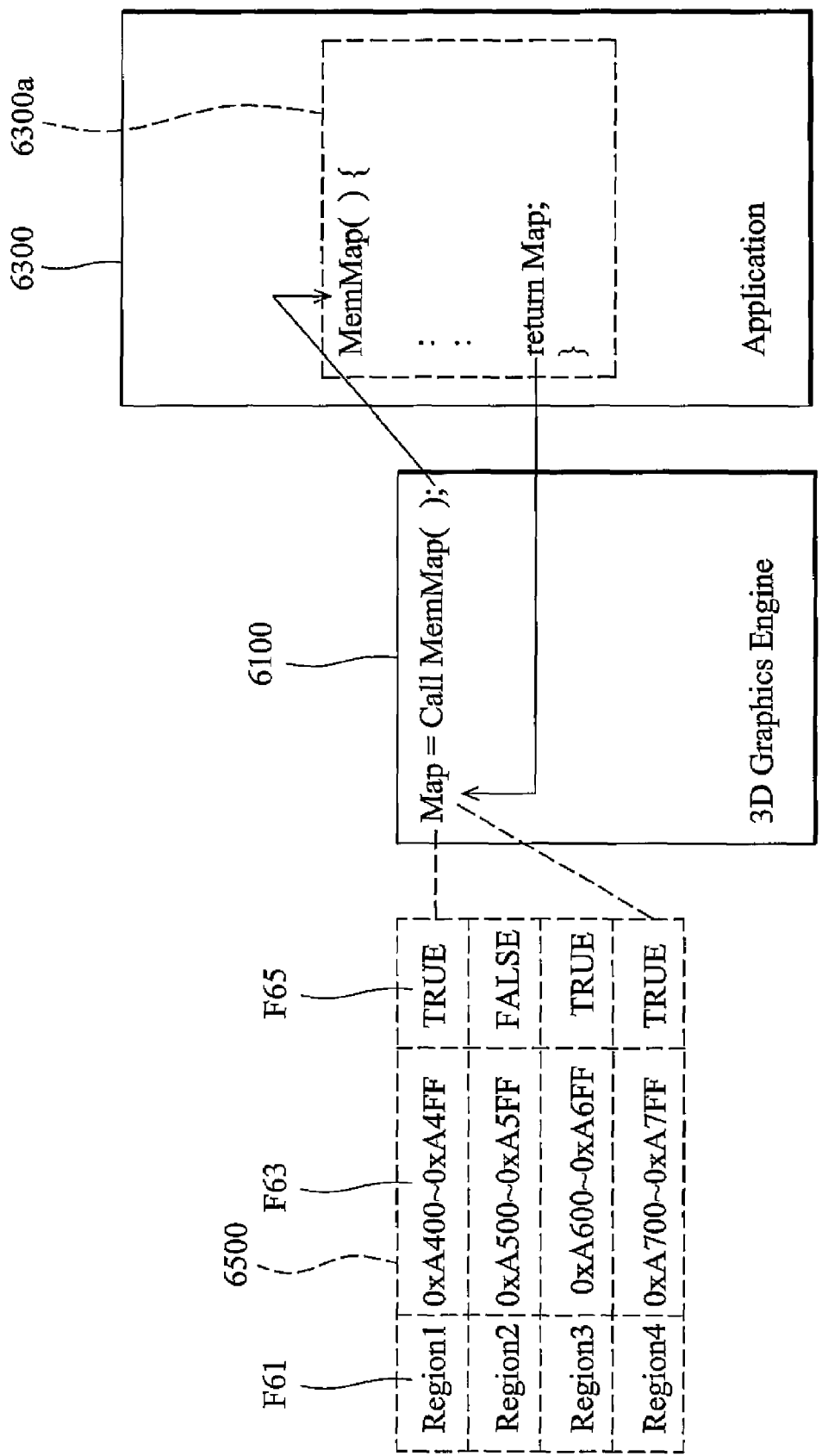
FIG. 6 is a diagram illustrating an exemplary memory map acquisition.

Four approaches can be employed for the determination of RO region. In a first approach, the application may implement a memory map acquisition function with a specific application programmable interface (API) to communicate with the 3D graphics engine, enabling the 3D graphics engine to acquire a memory map generated by the application via the provided API. It is to be understood that the memory query function is executed by a processor (e.g. 4305 of FIG. 4). FIG. 6 is a diagram illustrating an exemplary memory map acquisition. A 3D graphics engine (e.g. 6100) may make a function call of the provided API such as MemMap( ), and then, a memory map acquisition function (e.g. 6300a) returns a specific memory map (e.g. 6500) governed by an application (e.g. 6300). The memory map comprises information indicating that a particular region of a memory device (e.g. 4302, 4303 or the both of FIG. 4) has been configured to be an RO region or a read-write (RW) region by the application. For example, the memory map 6500 comprises information for four records identically corresponding to four regions of the memory device, and each record contains a region identifier F61, an address range F63 and an RO flag F65. RO flag being TRUE indicates that the corresponding address range is an RO region, and otherwise, is an RW region. The determination of RO region for the indicated texture image may be achieved by determining whether an RO flag corresponding to the indicated texture image is TRUE. For example, referring to step S510 of FIG. 5, when the first region storing the indicated texture image ranges between 0×A600 and 0×A6FF, it is determined that the first region of the memory device is an RO region by inspecting information provided by the acquired memory map 6500.

Figure 7:
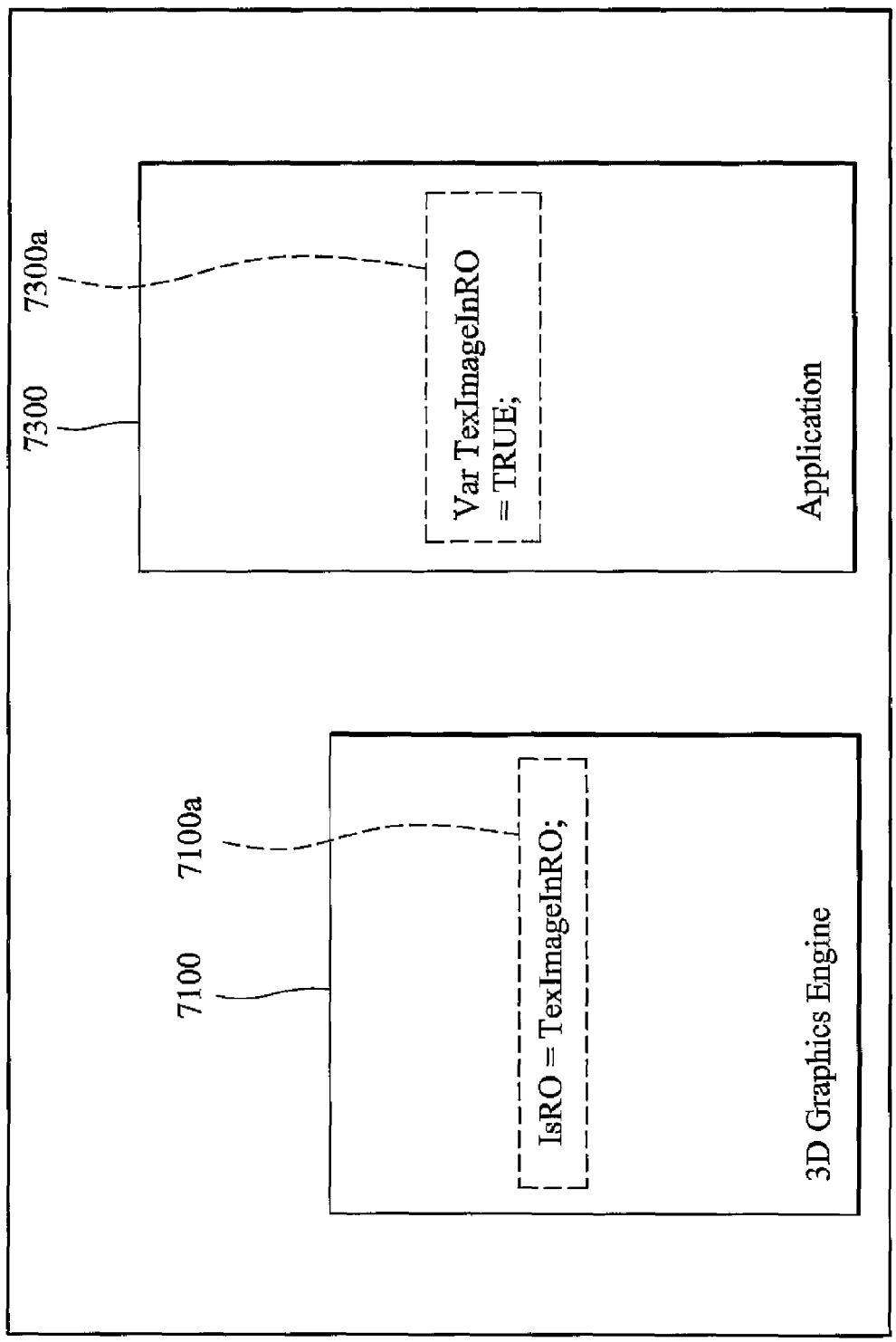
FIG. 7 is a diagram illustrating an exemplary state acquisition.

In a second approach, the application may declare a global variable selectively set to TRUE or FALSE to communicate with the 3D graphics engine, enabling the 3D graphics engine to acquire a state corresponding to the indicated texture image by retrieving the global variable. It is to be understood that the global variable can be retrieved by both the application and the 3D graphics engine. FIG. 7 is a diagram illustrating an exemplary state acquisition. An application may declare a global variable "TexImageInRO" and set the global variable to TRUE via an instruction 7300a in order to inform the 3D graphics engine of that the indicated texture image is stored in an RO region. Thereafter, the 3D graphics engine may retrieve a value of the global variable via an instruction 7100a and determine that the retrieved value is TRUE. Thus, referring to step S510 of FIG. 5, when detecting a TRUE value, it is determined that the first region of the memory device is an RO region.

Figure 8:
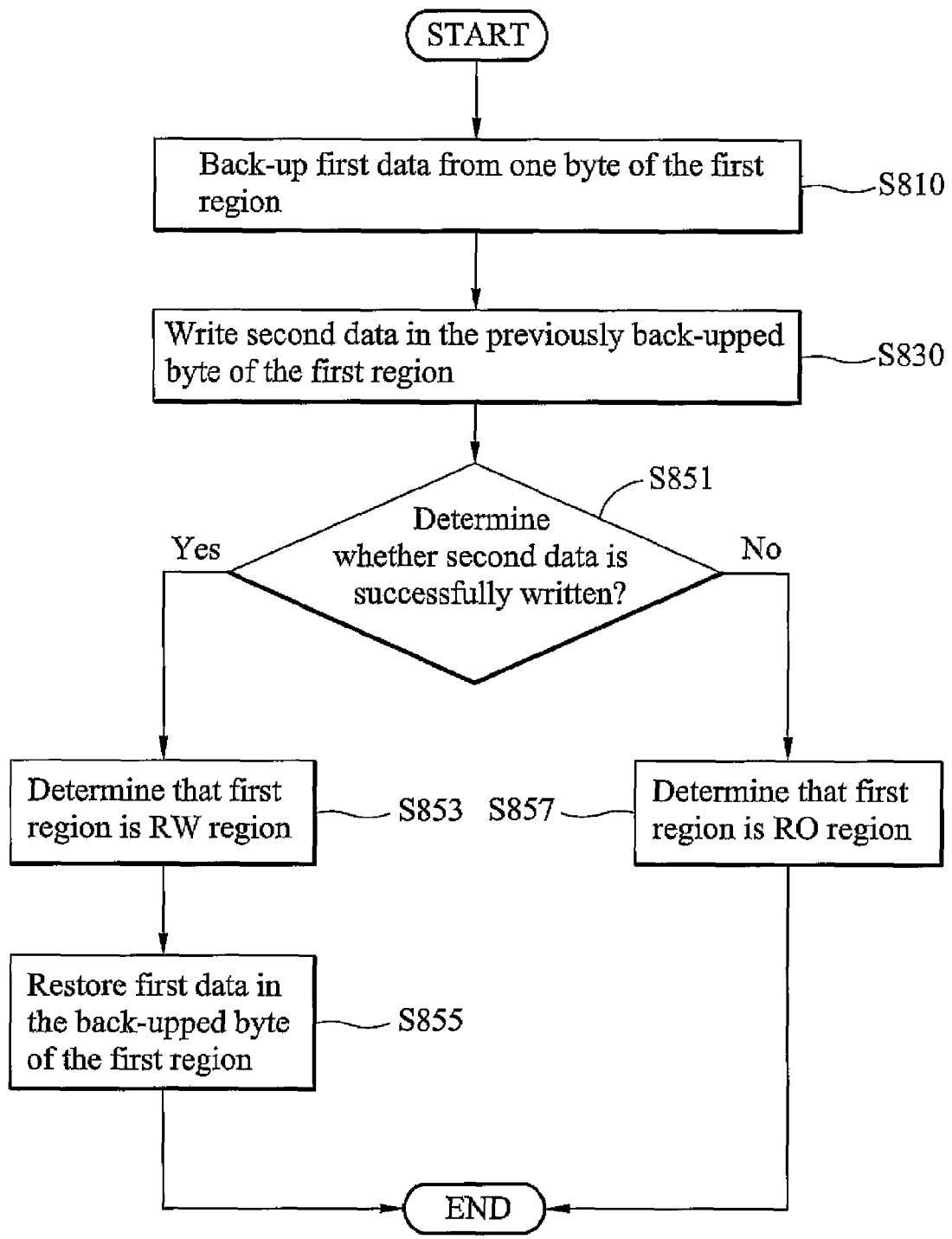
FIG. 8 is a flowchart illustrating an embodiment of a test procedure.

In a third approach, a 3D graphics engine (e.g. 4305 of FIG. 4) performs a test procedure to obtain test results, and then, determines whether the first region of the memory device is an RO region according to the obtained test results. FIG. 8 is a flowchart illustrating an embodiment of a test procedure performed by the 3D graphics engine. In step S810, first data is back-upped (i.e. retrieved) from one byte of the first region. In step S830, second data is written in the previously back-upped byte of the first region. In step S851, it is determined whether the second data is successfully written. If so, the process proceeds to steps S853 and S855, otherwise, to step S857. For example, it is determined that the second data is unsuccessfully written when receiving an error message indicating that the data write has failed, or when detecting that data stored in the back-upped byte of the first region is not the second data. In step S853, it is determined that the first region is an RW region. In step S855, the first data is restored in the back-upped byte of the first region. Preferably, in step S830, the second data is the first data processed by a bitwise XOR operation with "0×FF", and subsequently, when restoring the back-upped byte of the first region by step S853, the first data is restored by performing a bitwise XOR operation with "0xFF" to the second data. In step S857, it is determined that the first region is an RO region.

Figure 9:
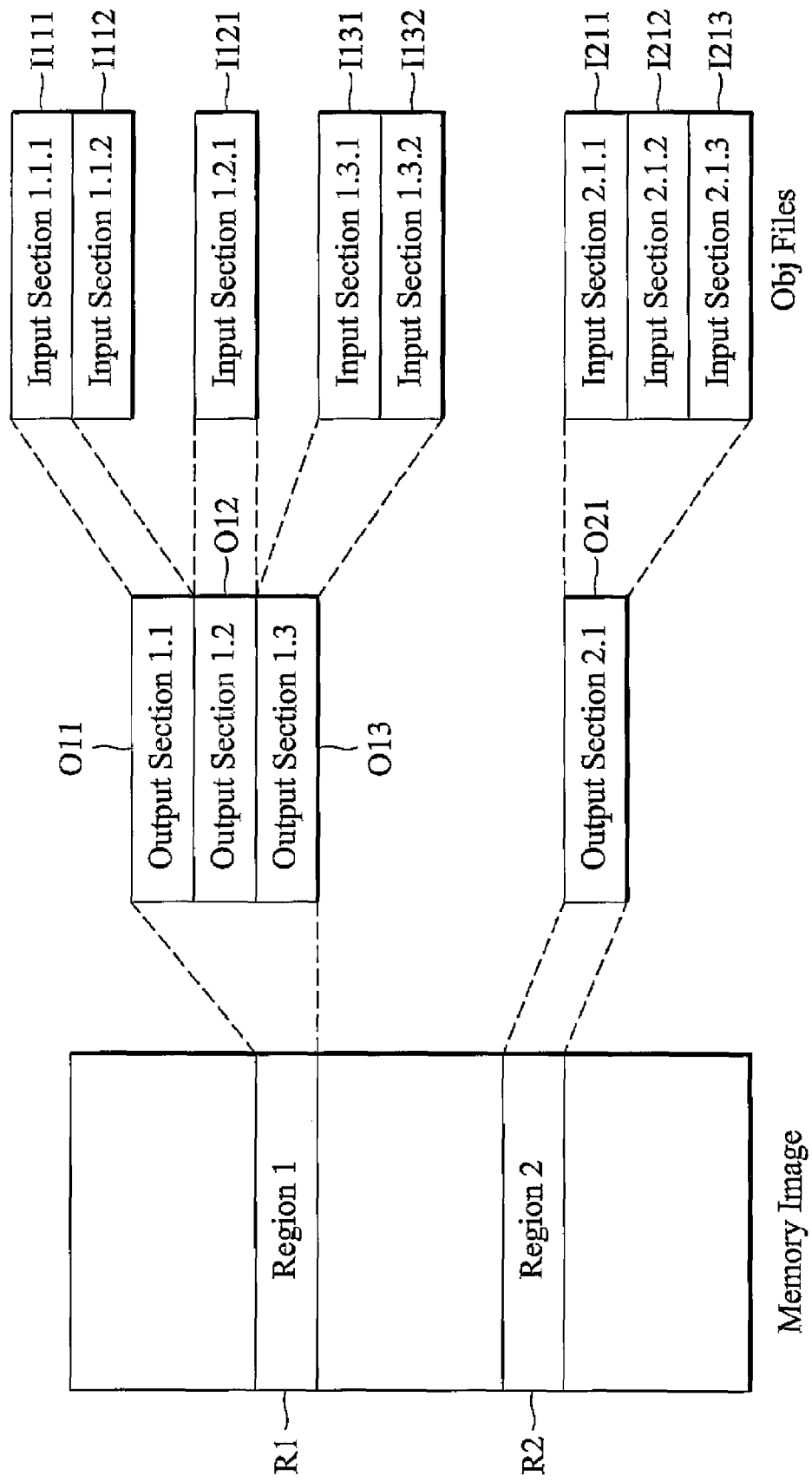
FIG. 9 is a diagram of an embodiment of a memory image.

In a fourth approach, a 3D graphics engine (e.g. 4305 of FIG. 4) determines whether the first region of the memory device is an RO region according to a memory image, preferably as stored in an executable file corresponding to the application. The executable file corresponding to the application is generated by a liner, such as an ARM linker. FIG. 9 is a diagram of an embodiment of a memory image. A memory image may be constructed from a hierarchy of images, regions, output sections and input sections. One image consists of one or more regions, such as R1 and R2. Each region consists of one or more output sections, such as O11, O12, O13 and O21. Each output section contains one or more input sections, such as I111, I112, I121, I131, I132, I211, I212 and I213. Input sections are the code and data information in an object file. An input section contains code or initialized data, or describes a fragment of memory that is not initialized or that are set to zero before the image can execute. Input sections can have attributes, RO, RW, or Zero-Initialized (ZI). An output section is a contiguous sequence of input sections that have the same RO, RW, or ZI attribute. An output section has the same attributes as its constituent input section. Thus, determination of the first region of the memory device can be achieved by inspecting a corresponding attribute for the first region. Specifically, it may acquire information indicating all input or output sections being RO regions by an instruction, such as "unsigned int RO_Base_Address=Image$$RO$$Base", and determine whether the first region is located in one of the acquired input or output sections. If so, it is determined that the first region is an RO region, otherwise, the first region is an RW region. Specifications for the memory image may refer to section 4.1 of ARM Developer Suite (Version 1.2) established 2001.

Referring to FIG. 5, in step S570, an RO attribute corresponding to the indicated texture image is marked as TRUE, instead of consuming additional storage space of writable memory device for storing the indicated texture image. The indicated texture image is to be acquired from the RO region and directly transmitted to a hardware-implemented 3D graphics drawing unit (e.g. 4306 of FIG. 4), thereby enabling the 3D graphics drawing unit to add the received texture image to relevant fragments. In step S591, an RO attribute corresponding to the indicated texture image is marked as FALSE. In step S593, a third region of a writable memory device (e.g. 4302) is allocated. In step S595, the indicated texture image is stored in the third region of the writable memory device, governed by the 3D graphics engine. Note that data stored in the third region cannot be modified until the third region is released by the 3D graphics engine to avoid destroying of the stored texture image by an application. The indicated texture image may be directly copied from the first region of the memory device to the third region of the writable memory device. The indicated texture image may be decoded by software, and then, stored in the third region of the writable memory device. The stored texture image is to be acquired from the third region and directly transmitted to a hardware-implemented 3D graphics drawing unit (e.g. 4306 of FIG. 4), thereby enabling the 3D graphics drawing unit to add the received texture image to relevant fragments.

Figure 10:
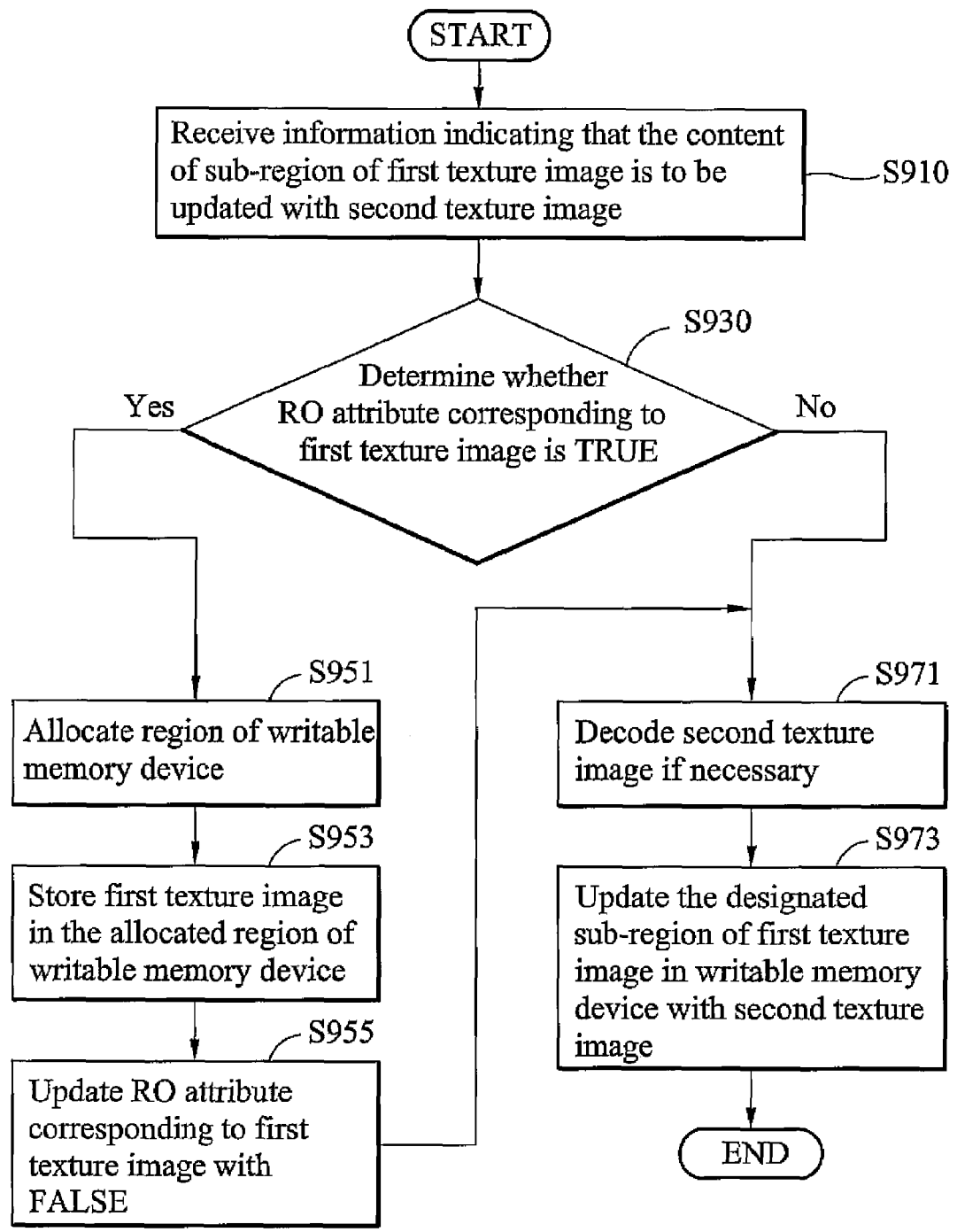
FIGS. 10 and 11 are flowcharts illustrating embodiments of methods for texture image management.

FIG. 10 is a flowchart illustrating an embodiment of a method for texture image management, particularly for modifying the content of a sub-region of a texture image, performed by a 3D graphics engine such as an OpenGL or DirectX graphics engine or other. In step S910, information indicating that the content of a sub-region of a first texture image is to be updated with a second texture image. Note that an RO attribute corresponding to the first texture image to indicate that the first texture image is originally stored in an RO region or an RW region. The details of the RO attribute, RO region and RW region may follow the description of step S550 (FIG. 5). In step S930, it is determined whether the RO attribute corresponding to the first texture image is TRUE. If so, the process executes steps S951 to S955 and S971 to S973, otherwise, executes only steps S971 to S973. In step S951, a region of a writable memory device (e.g. 4302 of FIG. 4) is allocated. In step S953, the first texture image is stored in the allocated region of writable memory device. In step S955, the RO attribute corresponding to the first texture image is updated with FALSE. In step S971, the second texture image is decoded if necessary. In step S973, the designated sub-region of the first texture image in the writable memory device is updated with the second texture image.

Figure 11:
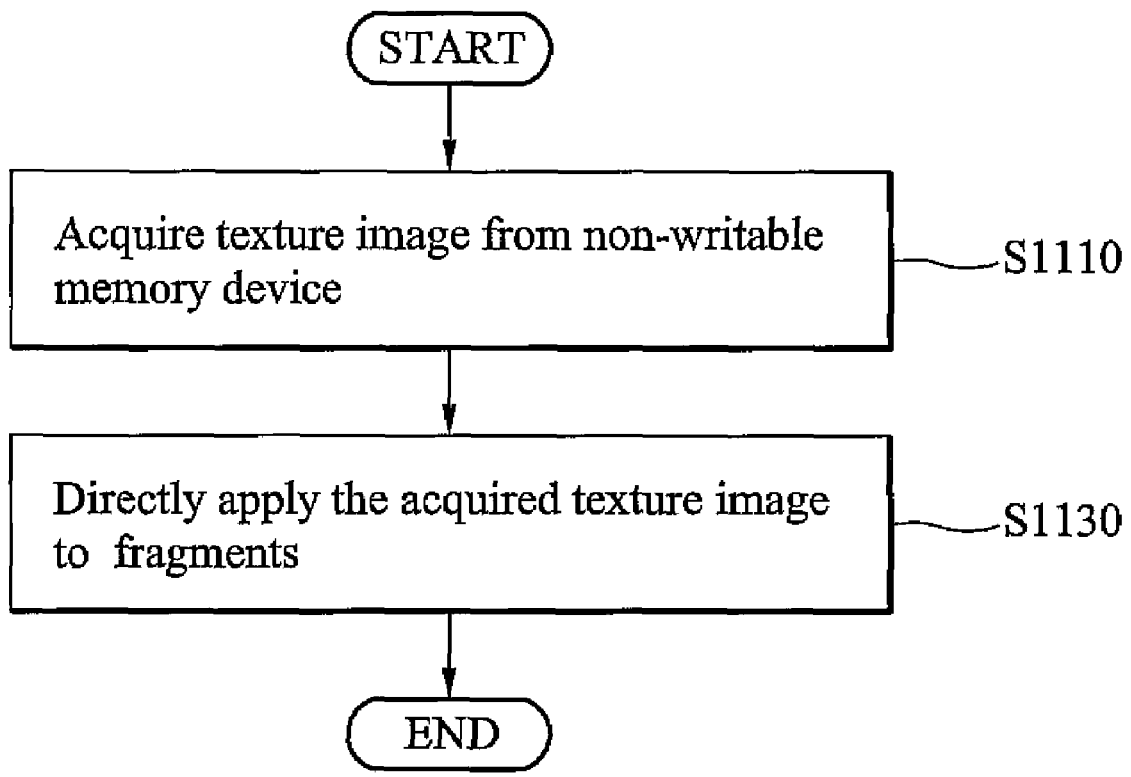

FIG. 11 is a flowchart illustrating an embodiment of a method for texture image management, particularly for performing pixel shading by employing a texture image, performed by a 3D graphics engine such as an OpenGL or DirectX graphics engine or other. In step S1110, a texture image (e.g. 2000 of FIG. 1) is acquired from a non-writable memory device (e.g. 4303 of FIG. 4). The texture image is composed of texels. In step S1130, the acquired texture image is directly applied to fragments during a pixel shading stage (e.g. 1270 of FIG. 1). Each fragment is composed of fragments. An attribute of the fragments of each fragment, such as color, depth or position on 2D screen, is combined with an attribute of texels of the texture images.

Certain terms are used throughout the description and claims to refer to particular system components. As one skilled in the art will appreciate, consumer electronic equipment manufacturers may refer to a component by different names. This document does not intend to distinguish between components that differ in name but not function. The term "couple" used in the specification and the claims is intended to mean either an indirect or direct electrical connection. For example, if a first device couples to a second device, that connection may be through a direct electrical connection, or through an indirect electrical connection via other devices and connections.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for texture image management, performed by a 3D graphics engine, comprising:

receiving information from an application, indicating that a texture image is stored in a first region of a memory device;

determining whether the first region of the memory device is a read-only (RO) region or a read-write (RW) region by:

acquiring a memory image stored in an executable file corresponding to the application;

determining the first region of the memory device is the RO region when detecting an RO attribute of an input or output section comprising the first region from the memory image; and determining the first region of the memory device is the RW region when detecting an RW attribute of an input or output section comprising the first region from the memory image, wherein the read-only (RO) region resides inside a NOR flash memory and the read-write (RW) region resides inside a RAM (Random Access Memory); and generating an RO attribute corresponding to the indicated texture image to indicate that the texture image is stored in the RO region when determining that the first region of the memory device is the RO region, thereby enabling the texture image retrieved from the first region to be applied to a fragment.

2. The method as claimed in claim 1 wherein the RO region is a region located in a non-writable memory device.

3. The method as claimed in claim 1 wherein the RO region is a region managed by the application to avoid data writes thereto.

4. The method as claimed in claim 1 further comprising:

generating an RO attribute corresponding to the indicated texture image to indicate that the texture image is stored in the RW region when determining that the first region of the memory device is the RW region;

allocating a second region of a writable memory device when determining that the first region of the memory device is the RW region; and storing the texture image retrieved from the first region in the second region, thereby enabling the texture image retrieved from the second region to be applied to a fragment, wherein data stored in the second region cannot be modified until the second region is released by the 3D graphics engine.

5. The method as claimed in claim 1 wherein the determining step further comprises:

acquiring information via an application programmable interface provided by the application;

determining the first region of the memory device is the RO region when the acquired information indicates that the first region is the RO region; and determining the first region of the memory device is the RW region when the acquired information indicates that the first region is the RW region.

6. The method as claimed in claim 1 wherein the determining step further comprises:

performing a test procedure; and determining whether the first region of the memory device is the RO region or the RW region according to a test result generated by the test procedure.

7. The method as claimed in claim 6 wherein the test procedure attempts to write data to the first region of the memory device, the method further comprising:

determining the first region is the RO region when the test result indicates that data is not successfully written to the first region; and determining the first region is the RW region when the test result indicates that data is successfully written to the first region.

8. A system for texture image management, employed in a portable electronic device, comprising:

a memory device storing a texture image; and a processor coupling to the memory device, and executing a 3D graphics engine and an application, wherein the 3D graphics engine receives information from the application, indicating that the texture image is stored in a first region of the memory device, determines whether the first region of the memory device is a read-only (RO) region residing inside a NOR flash memory or a read-write (RW) region residing inside a RAM (Random Access Memory), generates an RO attribute corresponding to the indicated texture image to indicate that the texture image is stored in the RO region when determining that the first region of the memory device is the RO region, thereby enabling the texture image retrieved from the first region to be applied to a fragment, acquires a memory image stored in an executable file corresponding to the application, determines the first region of the memory device is the RO region when detecting an RO attribute of an input or output section comprising the first region from the memory image, and determines the first region of the memory device is the RW region when detecting an RW attribute of an input or output section comprising the first region from the memory image.

9. The system as claimed in claim 8 wherein the RO region is a region located in a non-writable memory device.

10. The system as claimed in claim 8 wherein the RO region is a region managed by the application to avoid data writes thereto.

11. The system as claimed in claim 8 further comprising a writable memory device, wherein the 3D graphics engine generates an RO attribute corresponding to the indicated texture image to indicate that the texture image is stored in the RW region when determining that the first region of the memory device is the RW region, allocates a second region of the writable memory device when determining that the first region of the memory device is the RW region, and stores the texture image retrieved from the first region in the second region, thereby enabling the texture image retrieved from the second region to be applied to a fragment, and data stored in the second region cannot be modified until the second region is released by the 3D graphics engine.

12. The system as claimed in claim 8 wherein the 3D graphics engine acquires information via an application programmable interface provided by the application, determines the first region of the memory device is the RO region when the acquired information indicates that the first region is the RO region, and determines the first region of the memory device is the RW region when the acquired information indicates that the first region is the RW region.

13. The system as claimed in claim 8 wherein the 3D graphics engine performs a test procedure and determines whether the first region of the memory device is the RO region or the RW region according to a test result generated by the test procedure.

14. The system as claimed in claim 13 wherein the test procedure attempts to write data to the first region of the memory device, and the 3D graphics engine determines the first region is the RO region when the test result indicates that data is not successfully written to the first region, and determines the first region is the RW region when the test result indicates that data is successfully written to the first region.

* * * * *